US009335464B2

(12) United States Patent
Grigore

(10) Patent No.: US 9,335,464 B2
(45) Date of Patent: May 10, 2016

(54) EDGE-LIT LIGHT FIXTURE

(71) Applicant: Cooper Technologies Company, Houston, TX (US)

(72) Inventor: Valerica Grigore, Longmont, CO (US)

(73) Assignee: Cooper Technologies Company, Houston, TX (US)

( * ) Notice: Subject to any disclaimer, the term of this patent is extended or adjusted under 35 U.S.C. 154(b) by 86 days.

(21) Appl. No.: 14/258,874

(22) Filed: Apr. 22, 2014

(65) Prior Publication Data

US 2014/0313776 A1    Oct. 23, 2014

Related U.S. Application Data

(60) Provisional application No. 61/814,644, filed on Apr. 22, 2013.

(51) Int. Cl.
| | |
|---|---|
| *F21S 13/10* | (2006.01) |
| *F21V 15/00* | (2015.01) |
| *F21V 8/00* | (2006.01) |
| *F21S 8/06* | (2006.01) |
| *F21V 15/015* | (2006.01) |

(52) U.S. Cl.
CPC ............... *G02B 6/0091* (2013.01); *F21S 8/06* (2013.01); *F21V 15/015* (2013.01)

(58) Field of Classification Search
CPC .. G02B 6/0081; G02B 6/0086; G02B 6/0088; G02B 6/009; G02B 6/0091; G02B 6/0095
USPC ............... 362/367, 433, 616, 632–634
See application file for complete search history.

(56) References Cited

U.S. PATENT DOCUMENTS

| | | | |
|---|---|---|---|
| 3,852,916 | A | 12/1974 | Laby |
| 6,435,701 | B1 | 8/2002 | Chen |
| D526,737 | S | 8/2006 | Noh |
| D604,863 | S | 11/2009 | Ray |
| D662,643 | S | 6/2012 | Takahashi et al. |
| D698,975 | S | 2/2014 | Blessitt et al. |
| 2005/0041417 | A1 | 2/2005 | Mackin |
| 2005/0116667 | A1 | 6/2005 | Mueller et al. |
| 2005/0235570 | A1 | 10/2005 | Ginzel |
| 2006/0018126 | A1 | 1/2006 | Choi et al. |
| 2012/0182713 | A1 | 7/2012 | Bretschneider |
| 2013/0088890 | A1 | 4/2013 | Knapp et al. |

FOREIGN PATENT DOCUMENTS

| | | |
|---|---|---|
| CN | 1371018 | 9/2002 |
| WO | WO 2012/030387 | 3/2012 |

OTHER PUBLICATIONS

International Search Report for PCT/US2014/035010, mailed Aug. 7, 2014.
International Search Report mailed Aug. 7, 2014; for PCT/US 2014/026500.

*Primary Examiner* — Jason Moon Han
(74) *Attorney, Agent, or Firm* — King & Spalding LLP

(57) ABSTRACT

An edge-lit light fixture includes a first edge-lit light guide panel that has a first light guide. The edge-lit light fixture also includes a second edge-lit light guide panel that has a second light guide. The edge-lit light fixture further includes a center spine that has a protrusion. The first edge-lit light guide panel and the second edge-lit light guide panel are positioned on opposite sides of the protrusion. The protrusion separates a narrow edge of the first light guide from a narrow edge of the second light guide. A portion of the protrusion is positioned below the first light guide and the second light guide.

15 Claims, 18 Drawing Sheets

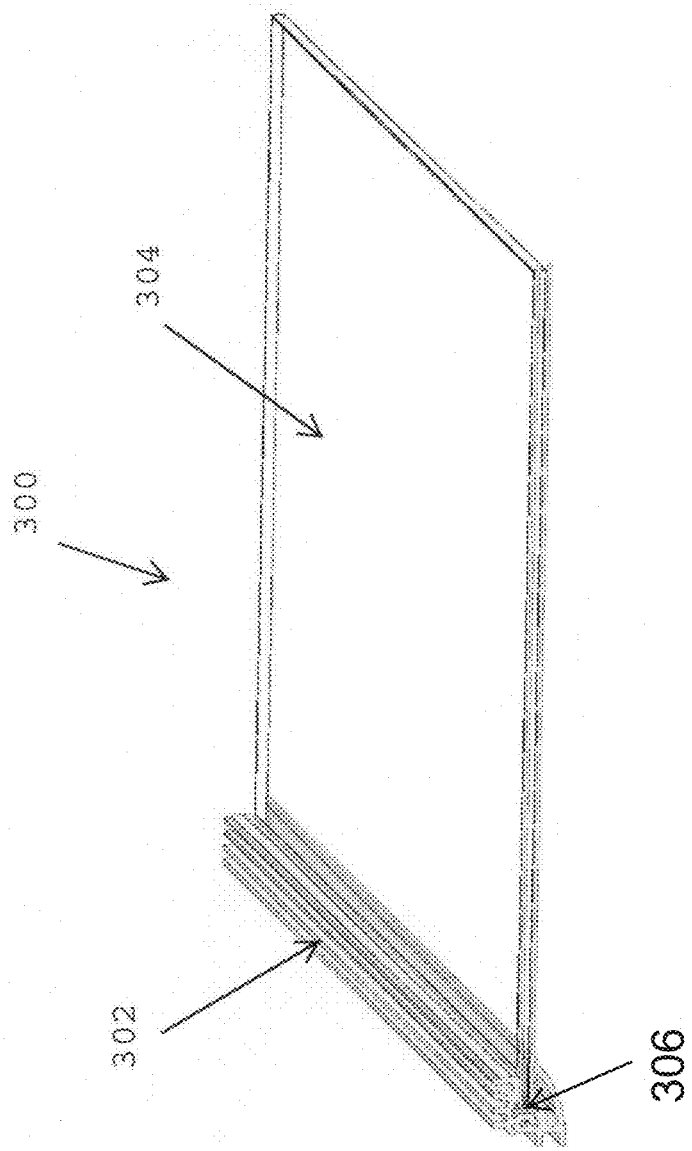

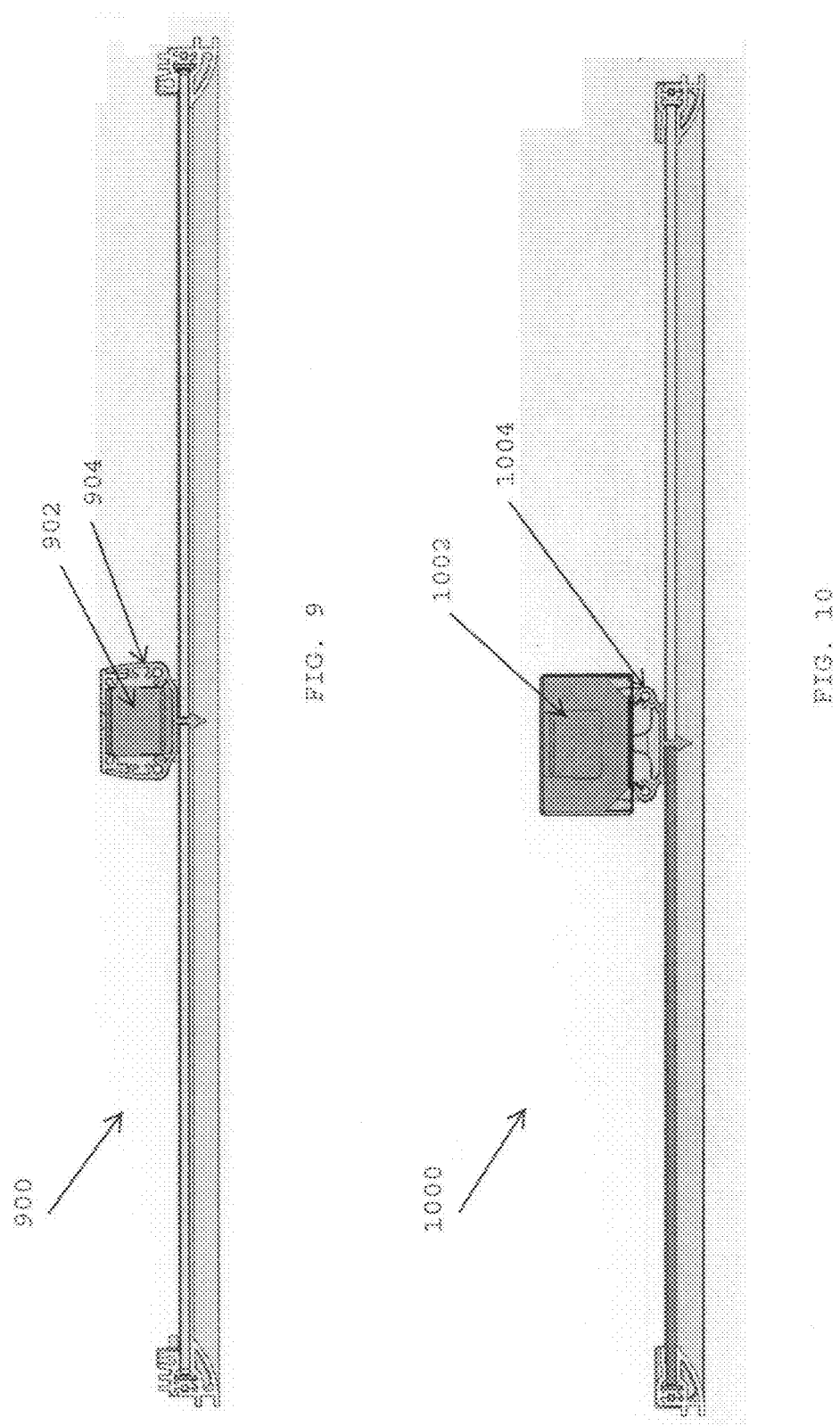

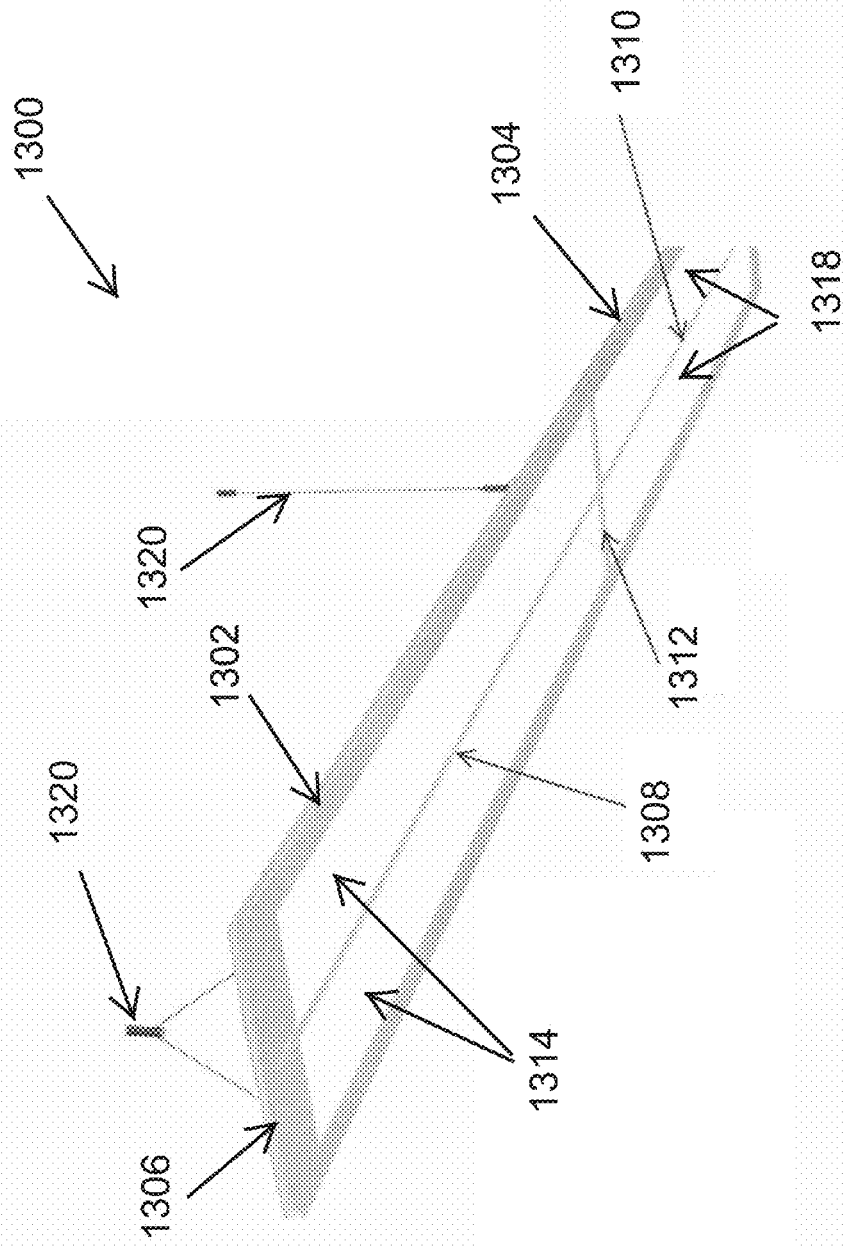

EDGE-LIT LIGHT FIXTURE

CROSS REFERENCE TO RELATED APPLICATIONS

The present application claims priority under 35 U.S.C. Section 119(e) to U.S. Provisional Patent Application No. 61/814,644, filed Apr. 22, 2013, and titled "EDGE-LIT LIGHT FIXTURE," the entire content of which is incorporated herein by reference.

TECHNICAL FIELD

The present disclosure relates generally to lighting solutions, and more particularly to edge-lit light fixtures.

BACKGROUND

An edge-lit luminaire generally has an edge-lit light guide (or sometimes referred to as waveguide or a light emitting panel). Typically, light from one or more light sources (e.g., one or more light emitting diodes (LEDs)) enters the light guide through a narrow edge/side of the light guide. For example, the light sources may be positioned close to the narrow edge of the light guide. A portion of the light that enters the light guide is typically emitted through at least one broad side of the light guide.

In some situations, a single edge-lit luminaire may not be able to provide a desired level of illumination. For example, multiple edge-lit or other kinds of luminaires may be needed to provide adequate illumination of an area. In such cases, multiple luminaires may need to be installed to provide the desired level of illumination. However, installing multiple standalone luminaires may not be practical in all situations. For example, space may not be available to accommodate installation of multiple standalone luminaires. Further, installation of multiple standalone luminaires may be relatively expensive and time consuming.

Accordingly, in some situations, a single edge-lit fixture that includes multiple light guides may provide a desired level of illumination at a reduced cost as compared to multiple edge-lit light fixtures. For example, such a single edge-lit light fixture may be easier to install, resulting in cost savings.

SUMMARY

In general, the present disclosure relates to edge-lit light fixtures. In an example embodiment, an edge-lit light fixture includes a first edge-lit light guide panel that has a first light guide. The edge-lit light fixture also includes a second edge-lit light guide panel that has a second light guide. The edge-lit light fixture further includes a center spine that has a protrusion. The first edge-lit light guide panel and the second edge-lit light guide panel are positioned on opposite sides of the protrusion. The protrusion separates a narrow edge of the first light guide from a narrow edge of the second light guide. A portion of the protrusion is positioned below the first light guide and the second light guide.

In another example embodiment, an edge-lit light guide panel includes a gripper and one or more light emitting diodes (LEDs) positioned within the gripper. The edge-lit light guide panel also includes a light guide having a narrow edge positioned within the gripper. The narrow edge is positioned proximal to the one or more LEDs. The light guide receives light from the one or more LEDs through the narrow edge and emits a portion of the light through at least one broad side of the light guide.

In another example embodiment, a gripper for holding a light guide includes a first segment configured to dissipate heat. The gripper also includes a second segment attached to the first segment. The first segment and the second segment are interlocked with each other. The first segment and the segment define a space for a portion of a light guide and light emitting diodes (LEDs) to be disposed therein. The first segment and the second segment are extruded pieces.

These and other aspects, objects, features, and embodiments will be apparent from the following description and the claims.

BRIEF DESCRIPTION OF THE FIGURES

Reference will now be made to the accompanying drawings, which are not necessarily drawn to scale, and wherein:

FIG. 3A illustrates an edge-lit light guide panel according to an example embodiment;

Figure 7A:
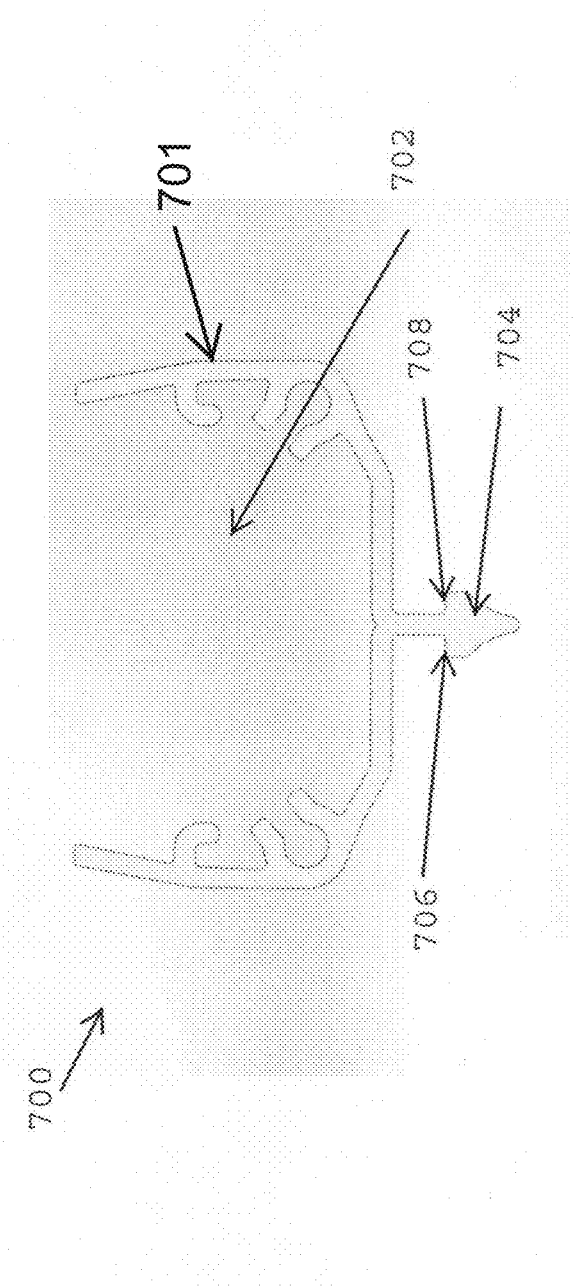
Figure 7B:
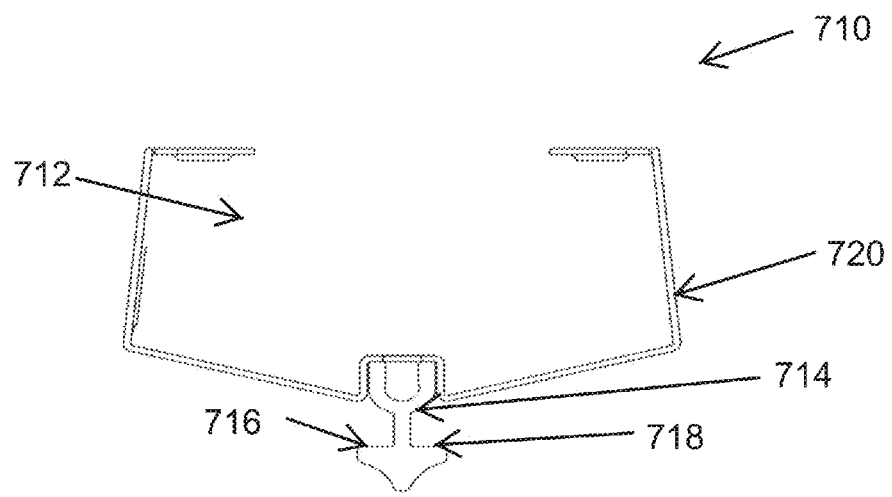
Figure 7C:
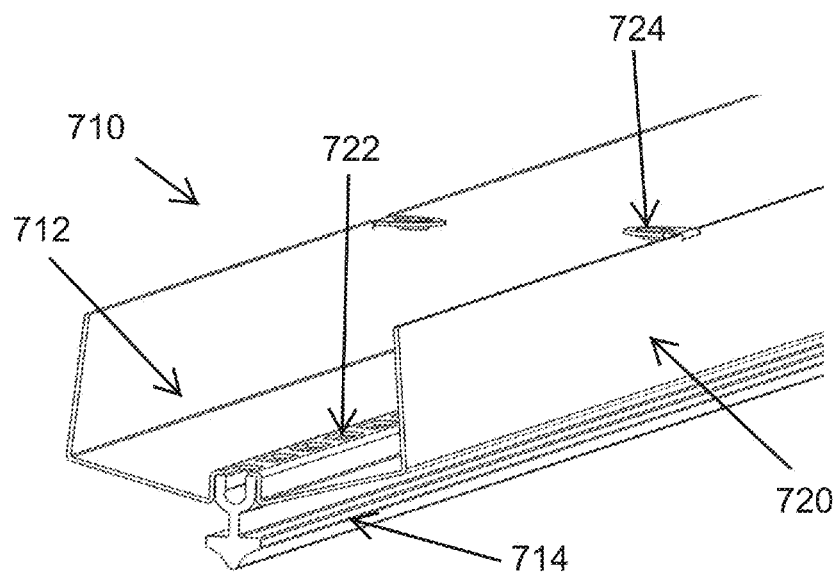
Figure 8:
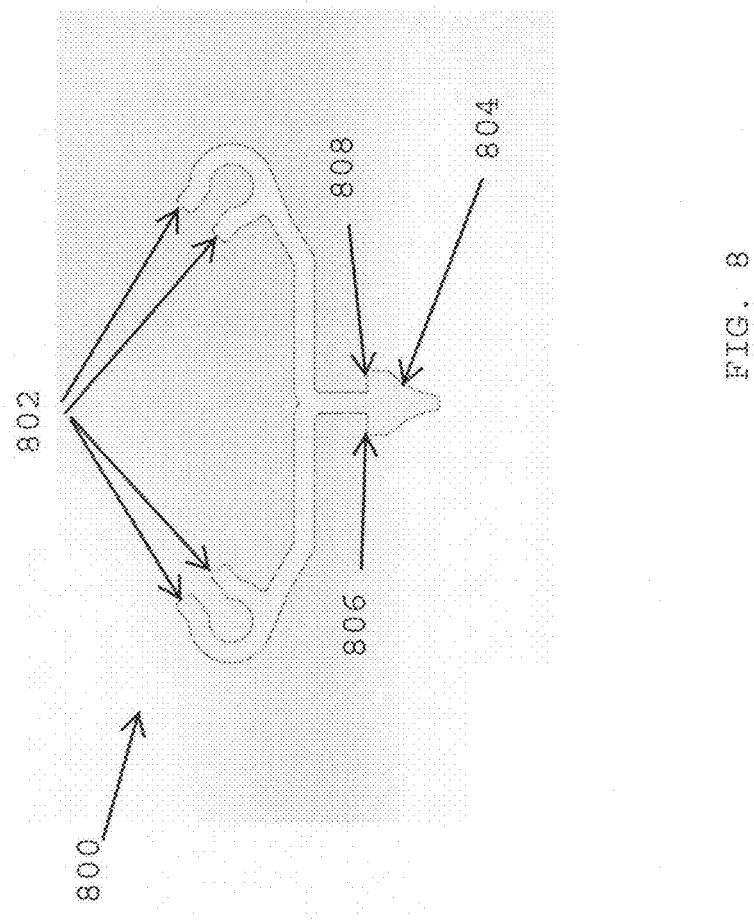
Figure 11A:
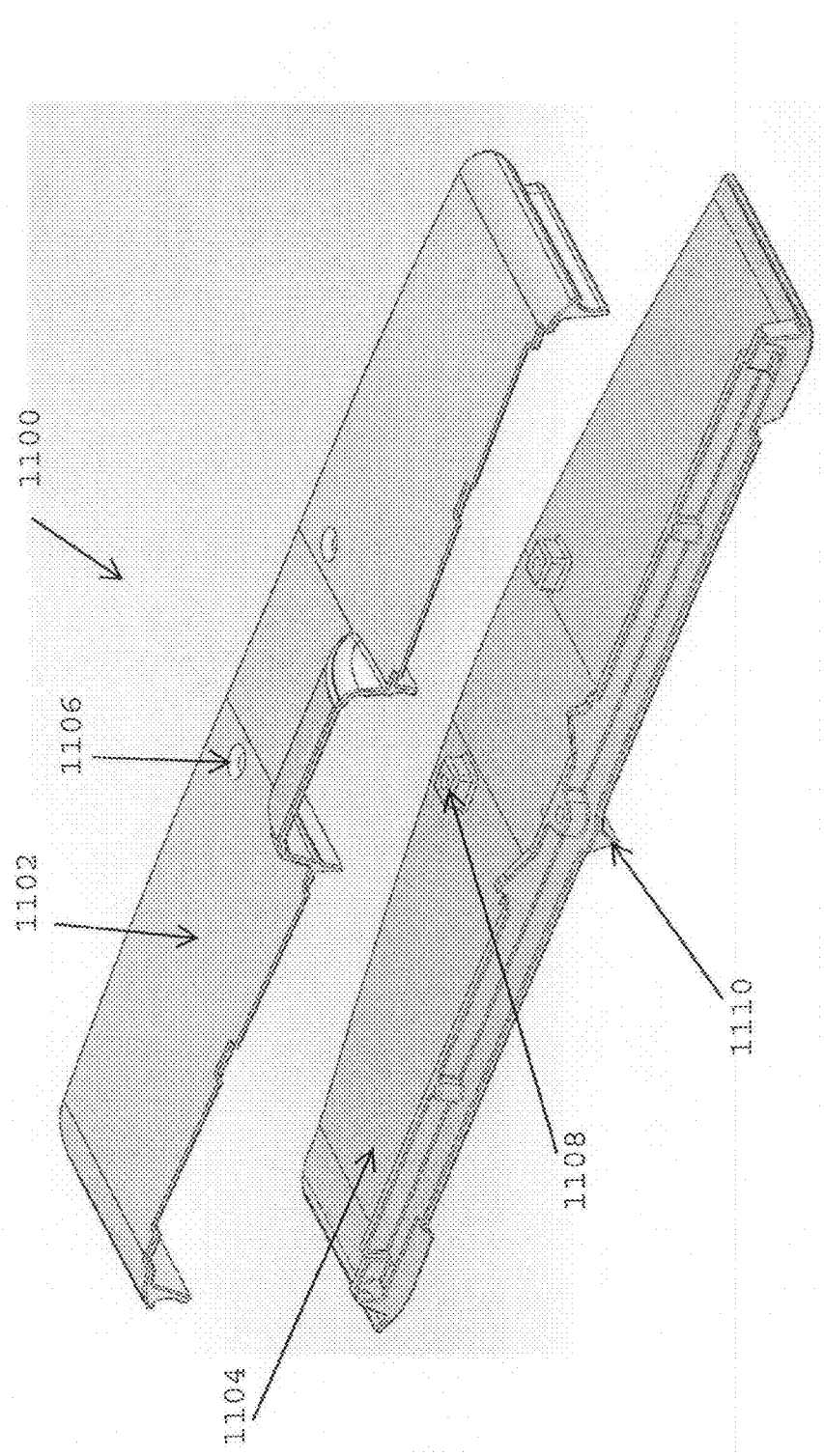
Figure 11B:
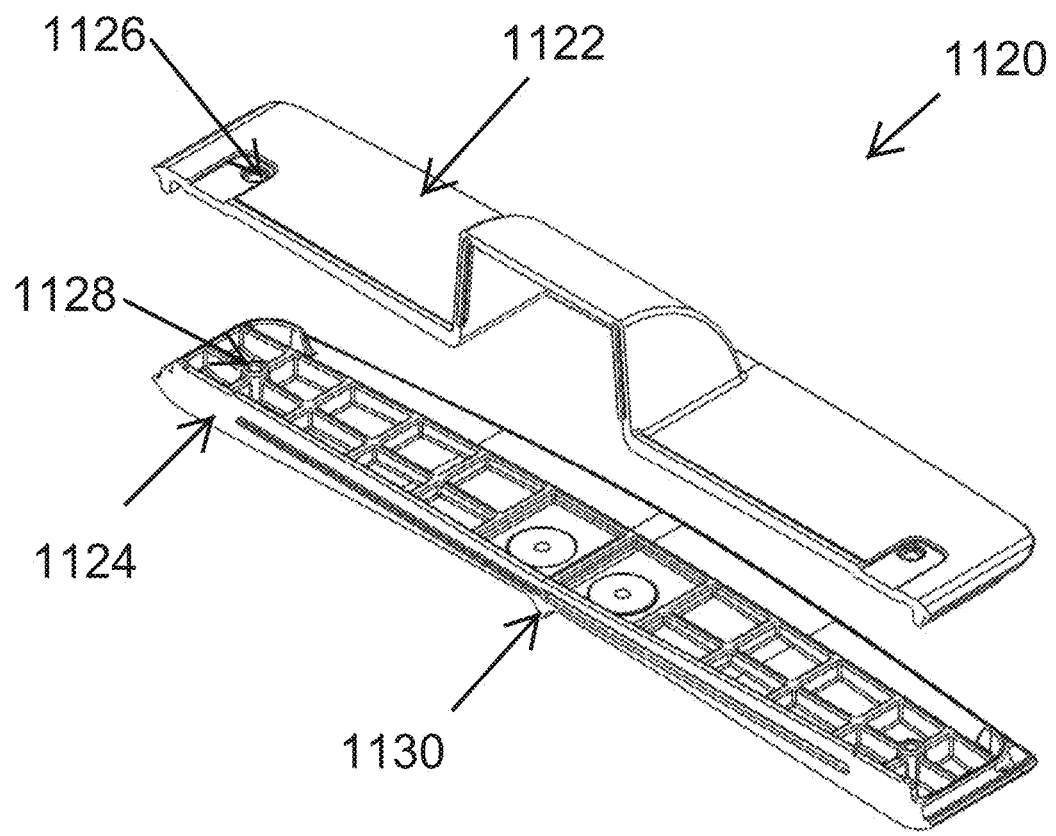
Figure 12:
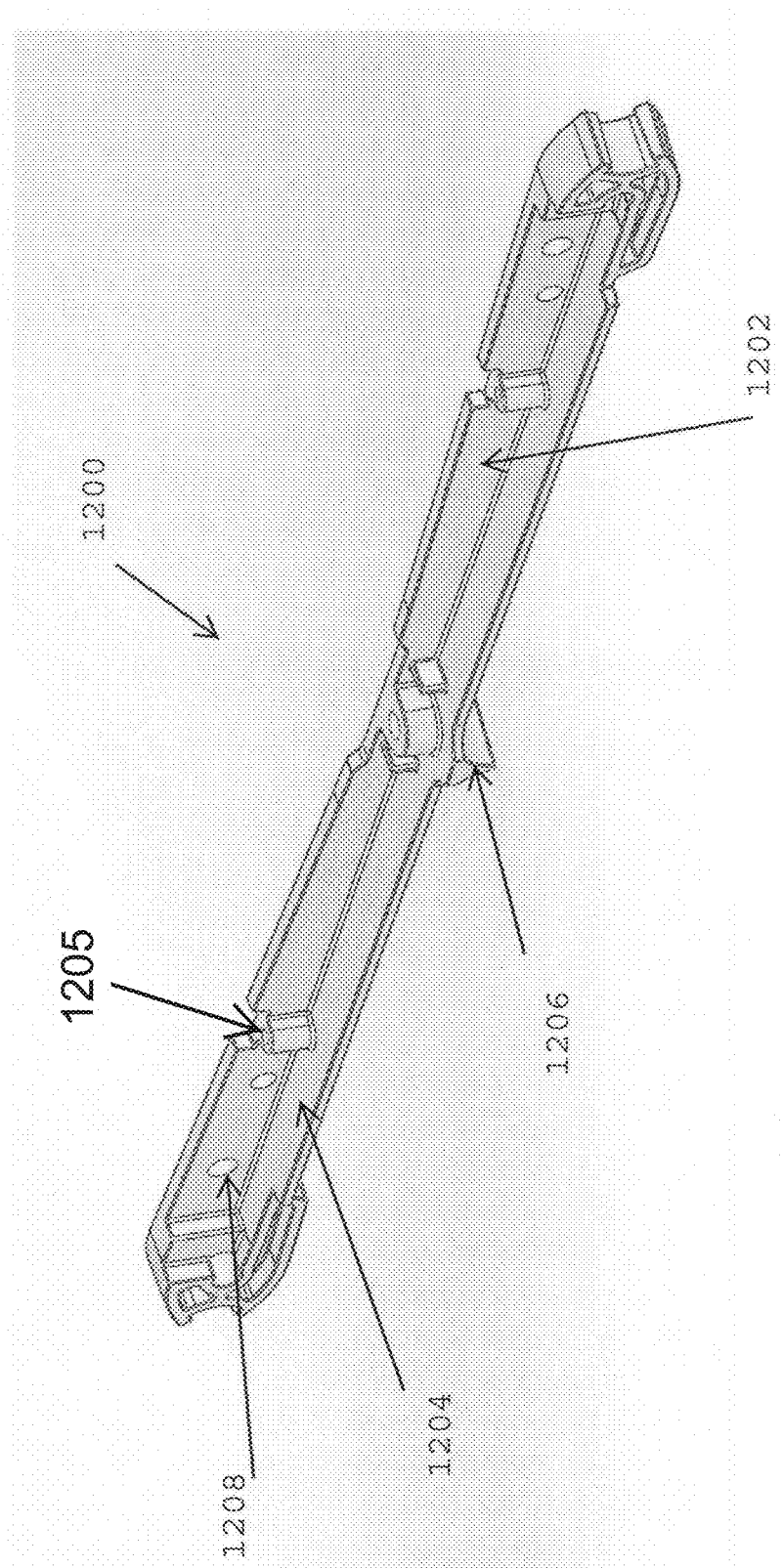

7A illustrates a center spine according to an example embodiment;

FIGS. 7B and 7C illustrate different views of a center spine according to another example embodiment;

FIG. 8 illustrates a center spine according to another example embodiment;

FIG. 9 illustrates an edge-lit light fixture including a center spine according to an example embodiment;

FIG. 10 illustrates an edge-lit light fixture including a center spine according to an example embodiment;

FIG. 11A illustrates an end cap of an edge-lit light fixture according to an example embodiment;

FIG. 11B illustrates an end cap of an edge-lit light fixture according to another example embodiment;

FIG. 12 illustrates a joiner end cap of an edge-lit light fixture according to an example embodiment; and FIG. 13 illustrates an edge-lit light fixture according to another example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, reference numerals designate like or corresponding, but not necessarily identical, elements.

DETAILED DESCRIPTION OF THE EXAMPLE EMBODIMENTS

In the following paragraphs, example embodiments will be described in further detail with reference to the figures. In the description, well known components, methods, and/or processing techniques are omitted or briefly described. Furthermore, reference to various feature(s) of the embodiments is not to suggest that all embodiments must include the referenced feature(s).

Figure 1:
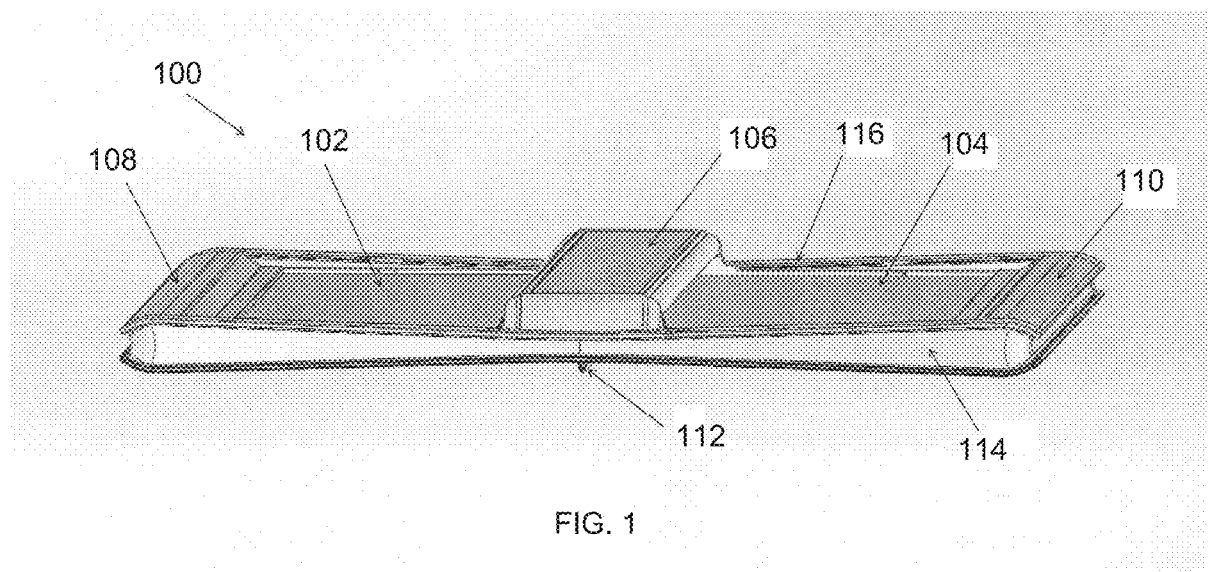
FIG. 1 illustrates an edge-lit light fixture that has multiple edge-lit light guide panels according to an example embodiment.

Turning now to the figures, example embodiments are described. FIG. 1 illustrates an edge-lit light fixture 100 that has multiple edge-lit light guide panels according to an example embodiment. The edge-lit light fixture 100 may be configured to provide illumination of an area around the edge-lit light fixture 100. In an example embodiment, the edge-lit light fixture 100 may be suspended from a structure such as a ceiling structure or attached directly to the ceiling. The edge-lit light fixture 100 includes a first edge-lit light guide panel 102, a second edge-lit light guide panel 104, and a center spine 106. The first edge-lit light guide panel 102 and the second edge-lit light guide panel 104, which are also referred to as light engines, may each emit light on one or both broad sides.

To illustrate, the first edge-lit light guide panel 102 includes a light guide (described below) and a gripper 108 that holds the light guide. Similarly, the second edge-lit light guide panel 104 includes another light guide and a gripper 110 that holds the light guide. One or more light emitting diodes (LEDs) (e.g., a printed circuit board (PCB) with a number of LEDs disposed thereon) or another light source may be positioned within each gripper 108, 110.

In some example embodiments, the center spine 106 includes a cavity as described below. For example, a power source (e.g., an LED driver) may be positioned in the cavity of the center spine 106. Alternatively, the power source may be positioned away from the edge-lit light fixture 100, and electrical wires from the remote power source may be routed through the center spine 106 to provide power to the LEDs that are positioned within each gripper 108, 110. In some example embodiments, the center spine 106 may also provide structural rigidity to the edge-lit light fixture 100. The center spine 106 may also have an overall aesthetically pleasing shape and appearance.

In some example embodiments, the center spine 106 includes a protrusion 112 that includes a ledge on each side of the protrusion to support a respective edge-lit light guide panel 102 or 104. The first edge-lit light guide panel 102 and the second edge-lit light guide panel 104 are positioned on opposite sides of the protrusion 112. In particular, a portion of the respective light guide of the edge-lit light guide panels 102, 104 may be positioned on a respective ledge of the protrusion 112. For example, the protrusion 112 may have an arrow-shaped profile, and sides of the arrow head may serve as ledges. Alternatively, the protrusion 112 may have another shape that is, for example, aesthetically pleasing. In some example embodiments, the protrusion 112 may glow and/or may emit light.

In some example embodiments, the edge-lit light fixture 100 also includes end caps 114, 116. The end caps 114, 116 extend between the grippers 108, 110 on opposite sides of the edge-lit light fixture 100. For example, the end caps 114, 116 may be attached to the grippers 108, 110 and to the center spine 106. The end caps 114, 116 may also hide one or more electrical wires from view. For example, electrical wires routed between the center spine 106 and the LEDs that are within each gripper 108, 110 may pass through the end caps 114, 116. In some example embodiments, the end caps 114, 116 may serve as structures for attaching cables that are used to suspend the edge-lit light fixture 100 from a ceiling.

In some example embodiments, the center spine 106, the grippers 108, 110, and the end caps 114, 116 may be made from aluminum or another metal. For example, the center spine 106, the grippers 108, 110, and the end caps 114, 116 may be extruded pieces. In some example embodiments, the grippers 108, 110, and the end caps 114, 116 may be painted. For example, the grippers 108 and 110 may be painted to have a reflective color.

Figure 2A:
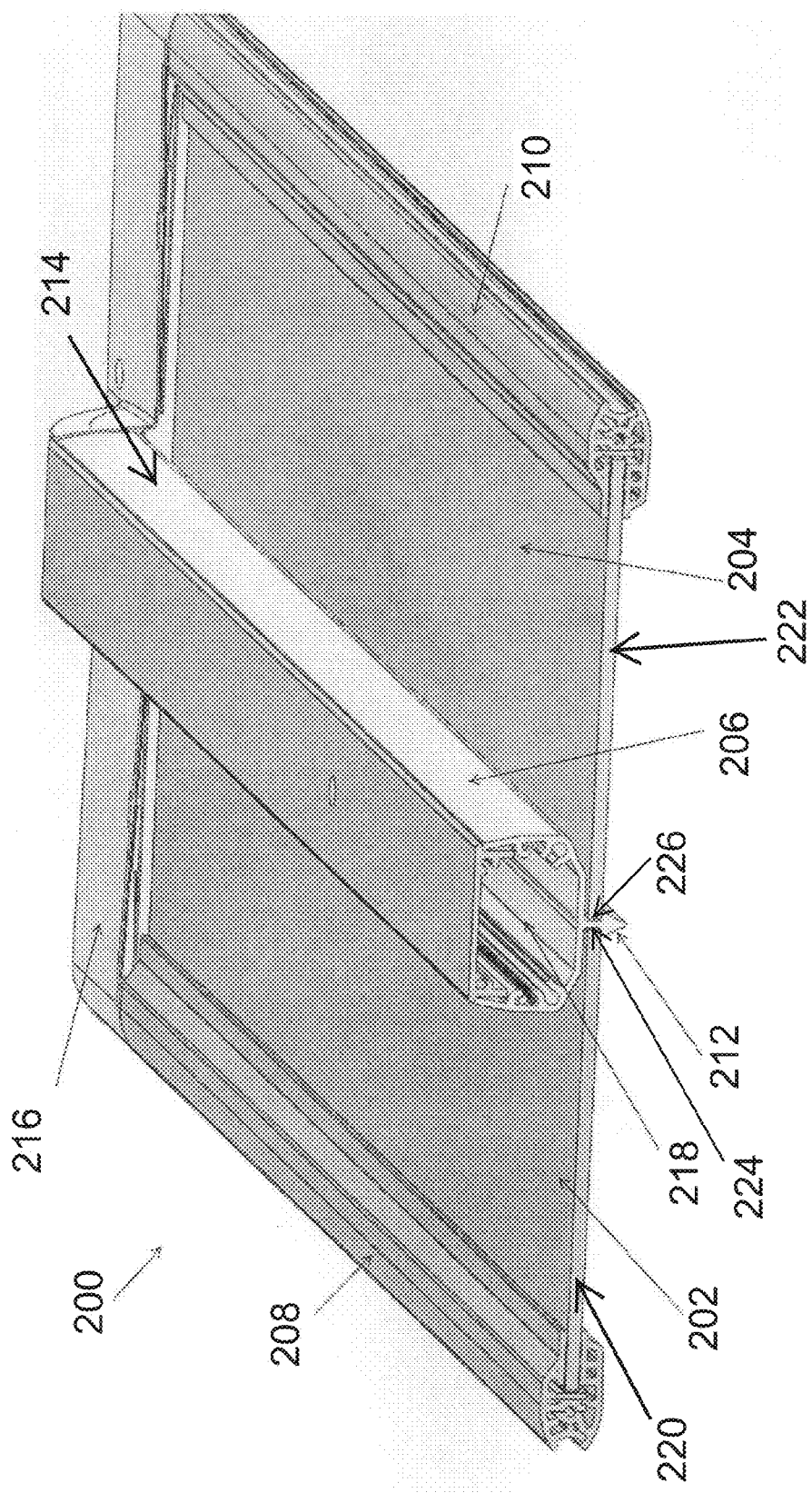
FIG. 2A illustrates an edge-lit light fixture that has multiple edge-lit light guide panels according to another example embodiment.

FIG. 2A illustrates an edge-lit light fixture 200 that has multiple edge-lit light guide panels according to an example embodiment. In an example embodiment, the edge-lit light fixture 200 corresponds to the edge-lit light fixture 100 of FIG. 1 without the end cap 114 shown in FIG. 1. The edge-lit light fixture 200 may be suspended from a ceiling or a similar structure. As shown in FIG. 2A, the edge-lit light fixture 200 includes a first edge-lit light guide panel 202 and a second edge-lit light guide panel 204. The first edge-lit light guide panel 202 includes a light guide 220 and a gripper 208. The second edge-lit light guide panel 204 includes a light guide 222 and a gripper 210. The first edge-lit light guide panel 202 and the second edge-lit light guide panel 204 are also referred to as light engines. As shown in FIG. 2A, a portion of the light guide 220 is positioned within the gripper 208, and a portion of the light guide 222 is positioned within the gripper 210. LEDs that are positioned within the grippers 208, 210 may emit light into the light guides 220, 222, and a portion of the light that enters the light guides 220, 222 may be emitted out through one or both broad sides of the light guides 220, 222.

The edge-lit light fixture 200 also includes a center spine 206. The center spine 206 includes an upper segment 214 that has a cavity 218. For example, one or more drivers such as LED drivers may be positioned in the cavity 218 to provide power to one or more LEDs that are positioned within the grippers 208, 210. For example, the grippers 208, 210 may correspond to the grippers 108, 110 of FIG. 1, respectively. In some alternative embodiments, one or more drivers may be positioned away from the edge-lit light fixture 200 and may provide power to the LEDs, for example, using wires that extend through the center spine 212 and/or through end caps such as an end cap 216. As illustrated in FIG. 2A, the light guides 220, 222 may be positioned on a protrusion 212 of the center spine 206. The first edge-lit light guide panel 202 and the second edge-lit light guide panel 204 are positioned on opposite sides of the protrusion 212. As illustrated in FIG. 2A, the protrusion 212 separates a narrow edge 224 of the first light guide 220 from a narrow edge 226 of the second light guide 222. A portion (i.e., arrow head portion) of the protrusion 212 is positioned below the first light guide 220 and the second light guide 222. For example, the protrusion 212 may provide support to the light guides 220, 222. To illustrate, a portion of the first light guide 220 proximal to the narrow edge of the first light guide 220 may be positioned on a ledge defined by a side of the arrow head portion of the protrusion 212, and a portion of the second light guide 222 proximal to the narrow edge of the second light guide 222 may be positioned on another ledge defined by another side of the arrow head portion of the protrusion 212. In some example embodiments, protrusion 212 may be formed integrally with the upper segment 214. In some alternative embodiments, the protrusion 212 may be formed separately and attached to the upper segment 214, for example, using one or more fasteners.

In some example embodiments, the center spine 206, the grippers 208, 210, and the end cap 216 may be made from the same or similar material and in the same manner as the center spine 106, the grippers 108, 110, and the end caps 114, 116 of FIG. 1. The light guides 220, 222 may be made from acrylic or another similar material.

Figure 2B:
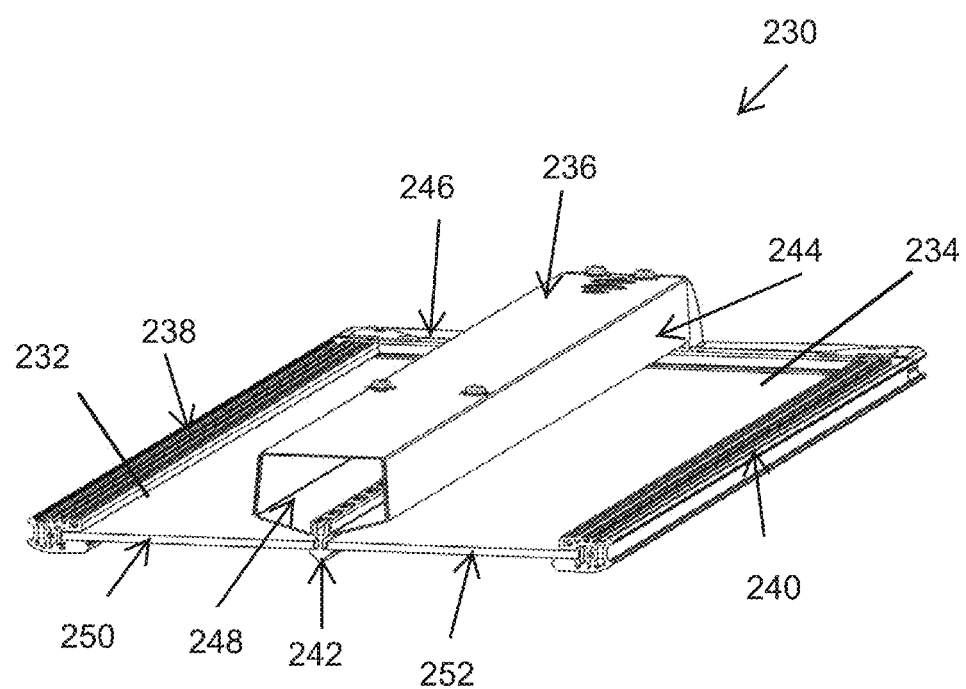
FIG. 2B illustrates an edge-lit light fixture that has multiple edge-lit light guide panels according to another example embodiment.

FIG. 2B illustrates an edge-lit light fixture 230 that has multiple edge-lit light guide panels according to an example embodiment. In an example embodiment, the edge-lit light fixture 230 may be recessed into a structure such as a ceiling. As shown in FIG. 2B, the edge-lit light fixture 230 includes a first edge-lit light guide panel 232 and a second edge-lit light guide panel 234. The first edge-lit light guide panel 232 includes a light guide 250 and a gripper 238. The second edge-lit light guide panel 234 includes a light guide 252 and a gripper 240. The first edge-lit light guide panel 232 and the second edge-lit light guide panel 232 are also referred to as light engines. As shown in FIG. 2B, a portion of the light guide 250 is positioned within the gripper 238, and a portion of the light guide 252 is positioned within the gripper 240.

The edge-lit light fixture 230 also includes a center spine 236. The center spine 236 includes an upper segment 244 that has a cavity 248. For example, one or more drivers such as LED drivers may be positioned in the cavity 248 to provide power to LEDs that are positioned within the grippers 238, 240. The LEDs may emit light into the light guides 250, 252, and a portion of the light that enters the light guides 250, 252 may be emitted out through one or both broad sides of the light guides 250, 252.

In some alternative embodiments, one or more drivers may be positioned away from the edge-lit light fixture 230 and may provide power to the LEDs, for example, using wires that extend through the center spine 236 and/or through end caps such as an end cap 246. As illustrated in FIG. 2B, the light guides 250, 252 may be positioned on a protrusion 242 of the center spine 236. The first edge-lit light guide panel 232 and the second edge-lit light guide panel 234 are positioned on opposite sides of the protrusion 242. As illustrated in FIG. 2B, the protrusion 242 separates a narrow edge of the first light guide 250 from a narrow edge of the second light guide 252. A portion (i.e., arrow head portion) of the protrusion 242 is positioned below the first light guide 250 and the second light guide 252. For example, the protrusion 242 may provide support to the light guides 250, 252. To illustrate, a portion of the first light guide 250 proximal to the narrow edge of the first light guide 250 may be positioned on a ledge defined by a side of the arrow head portion of the protrusion 242, and a portion of the second light guide 252 proximal to the narrow edge of the second light guide 252 may be positioned on another ledge defined by another side of the arrow head portion of the protrusion 242. In some example embodiments, the protrusion 242 may be formed separately and attached to the upper segment 244, for example, using one or more fasteners. Alternatively, the protrusion 242 and the upper segment 214 may be formed integrally as a single piece.

In some example embodiments, the center spine 236, the grippers 238, 240, and the end cap 246 may be made from the same or similar material and in the same manner as the center spine 106, the grippers 108, 110, and the end caps 114, 116 of FIG. 1. The light guides 250, 252 may be made from acrylic or another similar material.

FIG. 3A illustrates an edge-lit light guide panel 300 according to an example embodiment. In some example embodiments, the edge-lit light guide panel 300 may be used with a recessed edge-lit light fixture such as the edge-lit lighting fixture 230 of FIG. 2B. For example, the edge-lit light guide panel 300 may be used as the first edge-lit light guide panel 232 and the second edge-lit light guide panel 234 of the edge-lit lighting fixture 230 of FIG. 2B. The edge-lit light guide panel 300 includes a gripper 302 and a light guide 304. The gripper 302 holds the light guide 304 such that a light receiving edge of the light guide 304 is positioned proximal to one or more LEDs 306 that are positioned within the gripper 302. Light from the one or more LEDs 306 may enter the light guide 304 and may be emitted out on one or both broad sides of the light guide 304. In an example embodiment, the light guide 304 is made from acrylic. For example, the longest dimension of the light guide 304 along a narrow edge of the light guide 304 may be 1 foot, 2 feet, or 4 feet. Alternatively, the light guide 304 may have other dimensions with departing from the scope of this disclosure. In some example embodiments, the gripper 302 may be made from aluminum or another metal using a method such as extrusion.

Figure 3B:
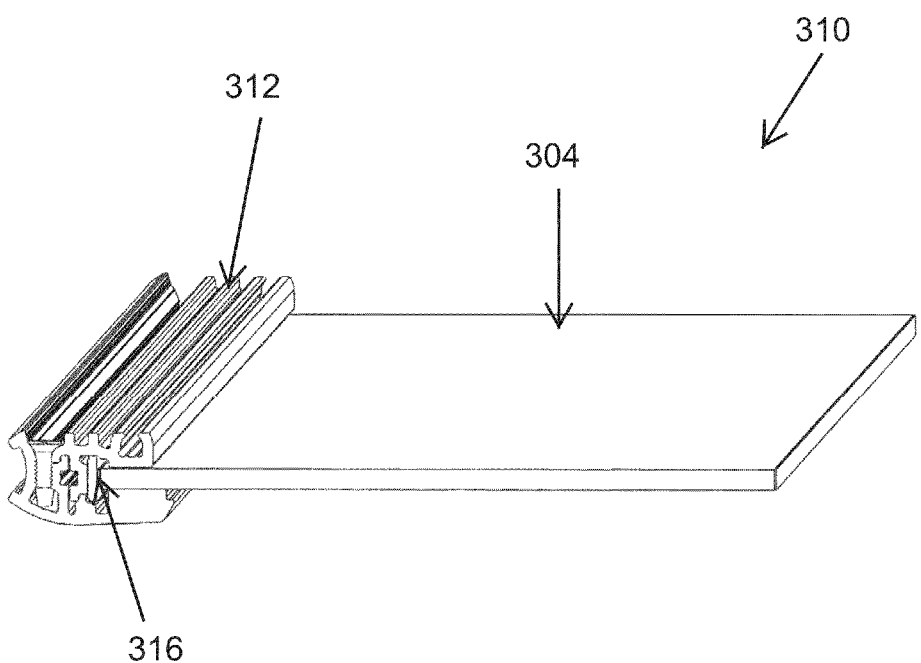
FIG. 3B illustrates an edge-lit light guide panel according to another example embodiment.

FIG. 3B illustrates an edge-lit light guide panel 310 according to another example embodiment. In some example embodiments, the edge-lit light guide panel 310 may be used with a recessed edge-lit light fixture such as the edge-lit lighting fixture 230 of FIG. 2B. For example, the edge-lit light guide panel 310 may be used as the first edge-lit light guide panel 232 and the second edge-lit light guide panel 234 of the edge-lit lighting fixture 230 of FIG. 2B. The edge-lit light guide panel 310 includes a gripper 312 and the light guide 304, which may be made from acrylic. The gripper 312 holds the light guide 304 such that a light receiving edge of the light guide 304 is positioned proximal to one or more LEDs 316 that are positioned within the gripper 312. Light from the one or more LEDs 316 may enter the light guide 304 and may be emitted out on one or both broad sides of the light guide 304. In some example embodiments, the gripper 312 may be made from aluminum or another metal using a method such as extrusion.

Figure 4A:
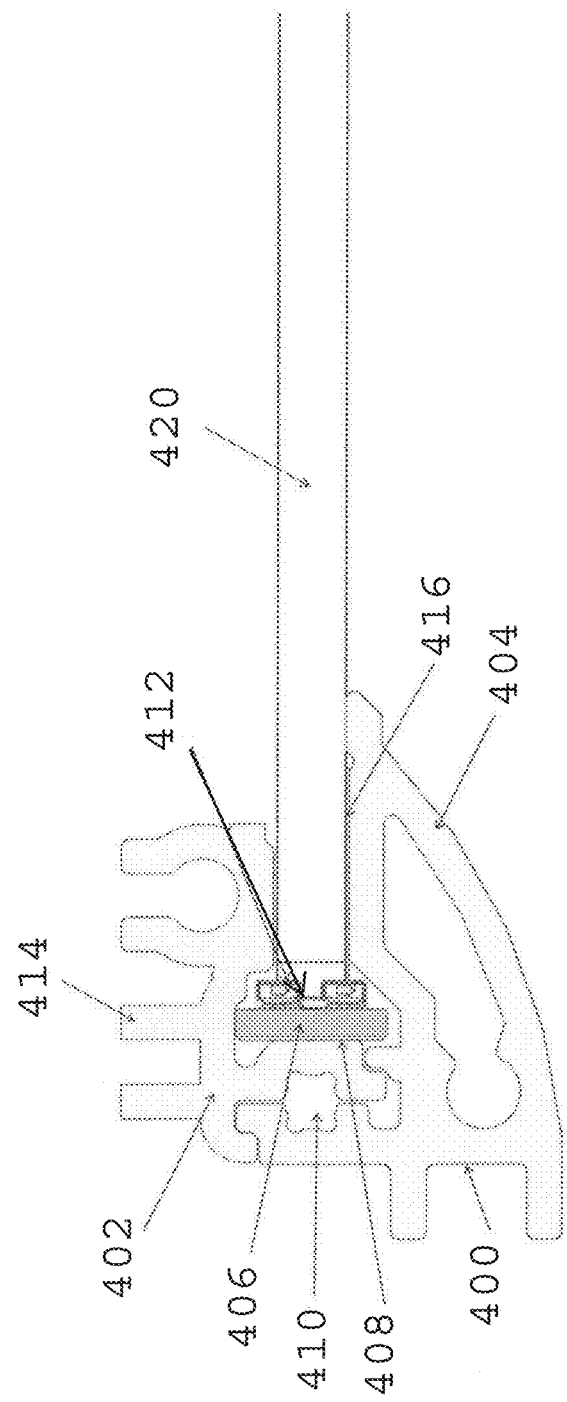
FIGS. 4A and 4B illustrate side views of a gripper holding a light guide according to an example embodiment.
Figure 4B:
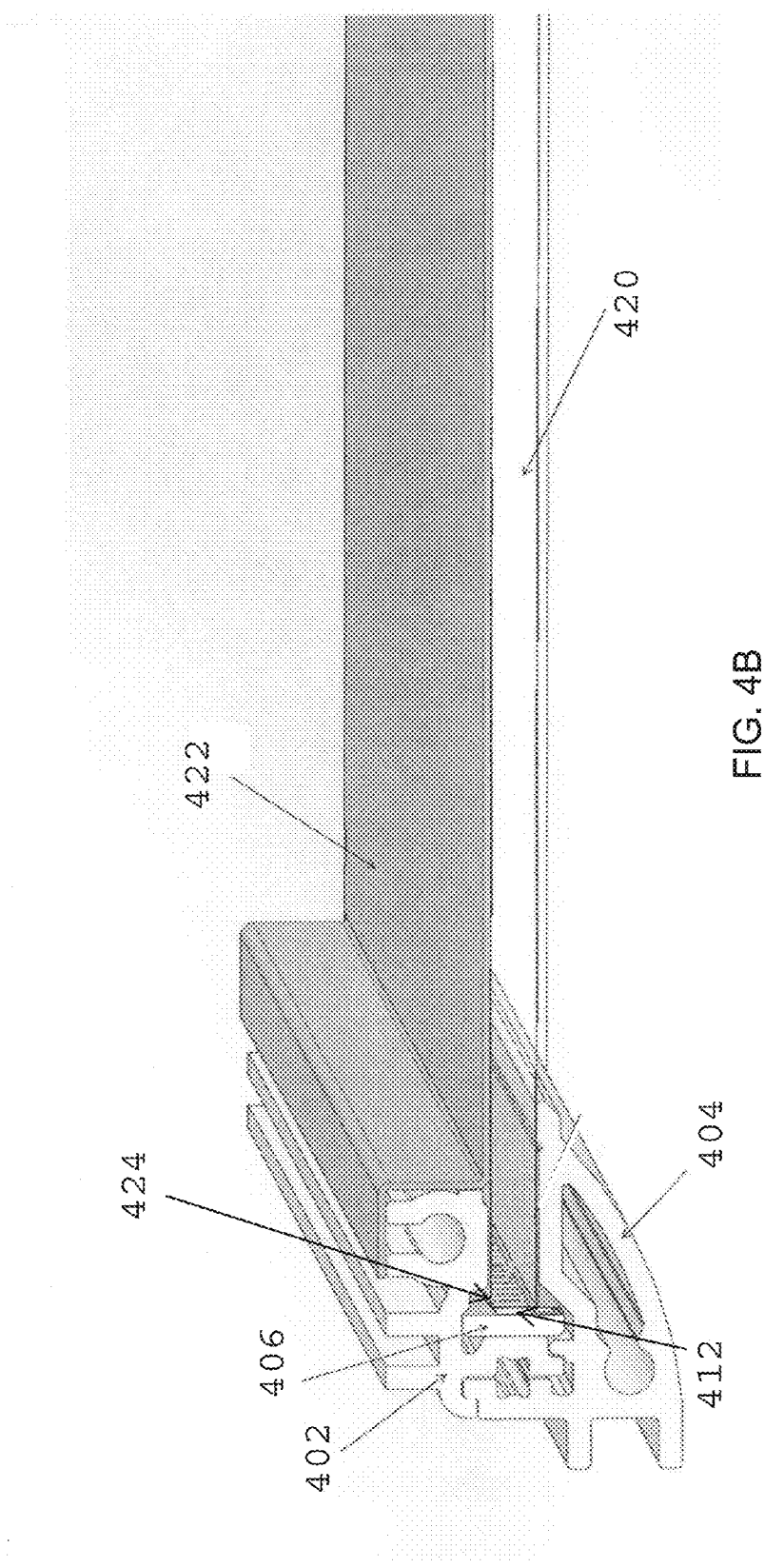

FIGS. 4A and 4B illustrate side views of a gripper 400 holding a light guide 420 according to example embodiment. Referring to FIGS. 4A and 4B, the gripper 400 includes a first segment 402 and a second segment 404. The first and second segments 402, 404 may be interlocked around a portion of the light guide 420, which may be made from acrylic. In some embodiments, a reflector 416 may be positioned between the gripper 400 and the light guide 420 as illustrated in FIG. 4A. Alternatively or in addition, the gripper 400 may be painted with a reflective color such as white. A PCB 406 including LEDs 412 may be positioned within the gripper 400. In an example embodiment, an adhesive tape 408 may be used to attach the PCB 406 to the gripper 400. The LEDs 412 emit light into the light guide 420 through a narrow side/edge 424 of the light guide 420 that is positioned within the gripper 400 close to the LEDs 412, and a portion of the light that enters the light guide 420 may be emitted on a broad side of the light guide 420. The gripper 400 may also have an aperture 410 that extends, for example, for the entire length of the gripper 400. A fastener such as a screw may be inserted in at least a portion of the aperture 410 to securely attach the first segment 402 and the second segment 404 to each other.

In an example embodiment, the first segment 402 may include one or more fingers 414 and may serve as a heat sink to dissipate heat from the LEDs 412 and the PCB 406. As illustrated in FIG. 4B, in some example embodiments, a back frame 422, such as a metal frame, may be positioned on the gripper 400 and the light guide 420. The back frame 422 may also have a reflective surface facing the light guide 420. In an example embodiment, the gripper 400 and the light guide 420 correspond to the gripper 302 and the light guide 304, respectively, of FIG. 3A. In an example embodiment, to assemble the gripper 400 and the light guide 420 into an edge-lit light guide panel such as the edge-lit light guide panel 300 of FIG. 3A, the PCB 406 may be first attached to the first segment 402 using the adhesive tape 408. The light guide 420 may then be positioned on the second segment 404 as shown. The first segment 402 may be vertically placed down onto the second segment 404 such that the first segment 402 interlocks with the second segment 404. A fastener may be extended in the aperture 410 before or after end caps, such as the end cap 246 of FIG. 2B, are attached to the edge-lit light guide panel.

Figure 4C:
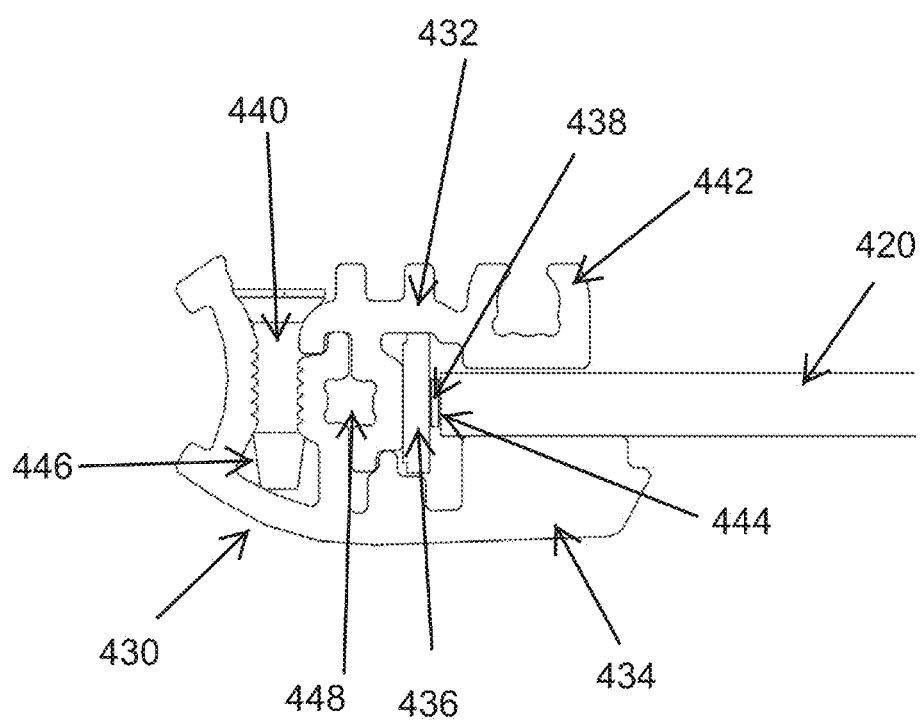
FIG. 4C illustrates a side view of a gripper holding a light guide according to another example embodiment.

FIG. 4C illustrates a side view of a gripper 430 holding the light guide 420 according to another example embodiment. The gripper 430 includes a first segment 432 and a second segment 434. The first and second segments 432, 434 may be interlocked around a portion of a light guide 420. In some embodiments, a reflector may be positioned between the gripper 430 and the light guide 420 in a similar manner as illustrated in FIG. 4A. Alternatively or in addition, the gripper 430 may be painted with a reflective color such as white. A PCB 436 including LEDs 438 may be positioned within the gripper 430. In an example embodiment, an adhesive tape may be used to attach the PCB 436 to the gripper 430 in a similar manner as illustrated in FIG. 4A. The LEDs 438 emit light into the light guide 420 through a narrow side/edge 444 of the light guide 420 that is close to the LEDs 438, and a portion of the light that enters the light guide 420 may be emitted on a broad side of the light guide 420. The gripper 430 also has an aperture 448 that extends, for example, for the entire length of the gripper 430. A fastener 440 (e.g., a screw) may be used to securely attach the first segment 432 and the second segment 434 to each other and to prevent the first segment 432 and the second segment 434 from detaching from each other. For example, the fastener 440 may be inserted in a space 446 that is between two substantially vertical sections of the second segment 434 such that a portion of the fastener exerts a downward force on a section of the first segment 432 that is interlocked with one of the two sections of the second segment 434.

In an example embodiment, the first segment 432 may include one or more fingers 442 and may serve as a heat sink to dissipate heat from the LEDs 438 and the PCB 436. In an example embodiment, the gripper 430 and the light guide 420 may be used in the edge-lit lighting fixture 230 of FIG. 2B. The gripper 430 and the light guide 420 may be assembled into an edge-lit light guide panel, such as the edge-lit light guide panel 300 of FIG. 3A, in the same or similar manner described with respect to the gripper 400 and the light guide 420 of FIGS. 4A and 4B. The gripper 430 may be attached to a longer or shorter side of the light guide 420.

Figure 5:
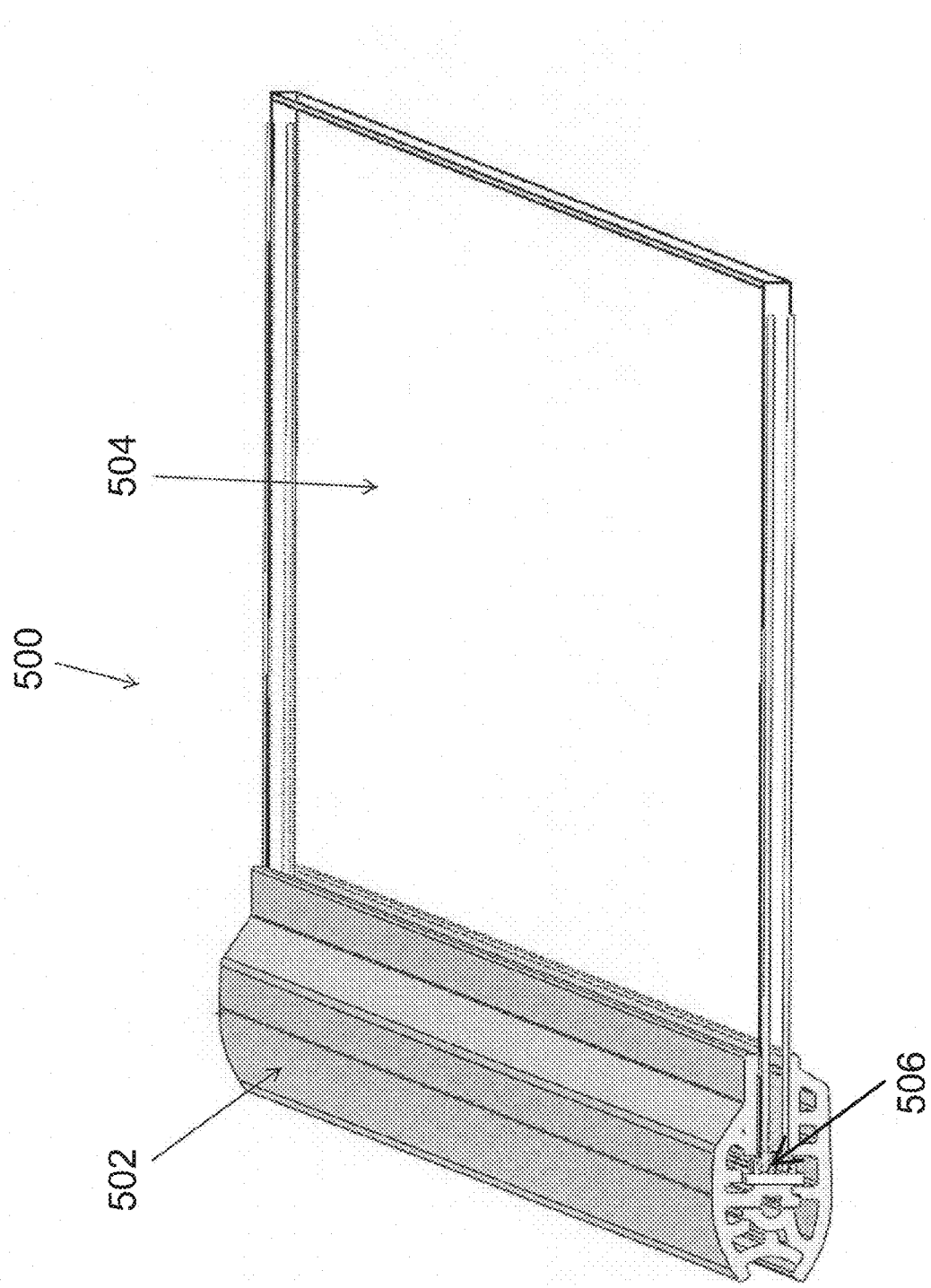
FIG. 5 illustrates an edge-lit light guide panel according to another example embodiment.

FIG. 5 illustrates an edge-lit light guide panel 500 according to another example embodiment. In some example embodiments, the edge-lit light guide panel 500 may be used with a suspended or surface mount edge-lit light fixture such as the edge-lit light fixture 100 of FIG. 1 and the edge-lit light fixture 200 of FIG. 2A. For example, the edge-lit light guide panel 500 may be used as the first edge-lit light guide panel 102 and the second edge-lit light guide panel 104 of the edge-lit lighting fixture 100 of FIG. 1. As another example, the edge-lit light guide panel 500 may be used as the first edge-lit light guide panel 202 and the second edge-lit light guide panel 204 of the edge-lit lighting fixture 200 of FIG. 2A. The edge-lit light guide panel 500 includes a gripper 502 and a light guide 504. The gripper 502 holds the light guide 504 such that a narrow edge of the light guide 504 is positioned proximal to LEDs 506 that are positioned within the gripper 502. The gripper 502 may be attached to a longer or shorter side of the light guide 504. Light from the LEDs 506 may enter the light guide 504 through the narrow edge of the light guide 504 and may be emitted out on one or both broad sides of the light guide 504. In an example embodiment, the light guide 504 is made from acrylic, and the gripper 502 may be made from aluminum or another metal. In an example embodiment, the longest dimension of the light guide 504 along a narrow edge of the light guide 504 may be 1 foot, 2 feet, or 4 feet. Alternatively, the light guide 504 may have other dimensions with departing from the scope of this disclosure.

Figure 6:
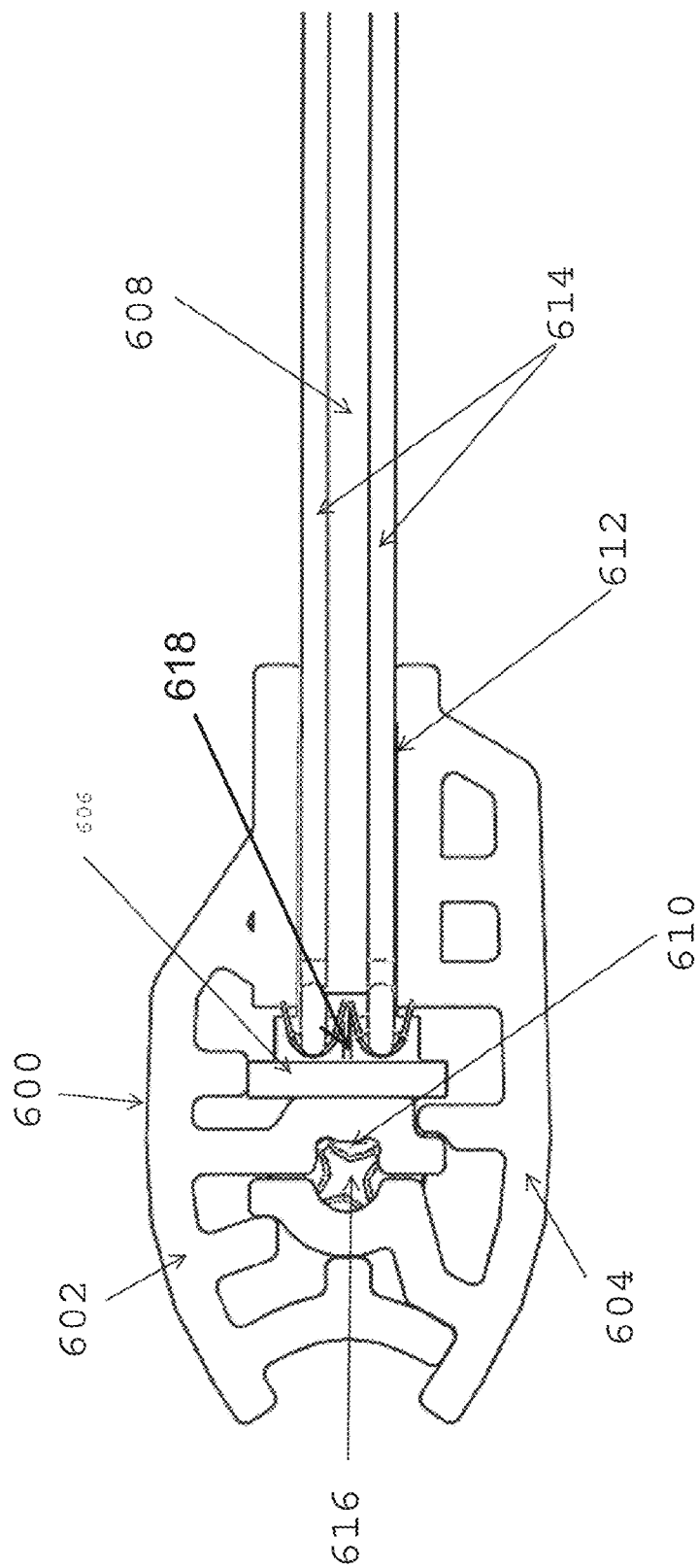
FIG. 6 illustrates a close view of a gripper according to an example embodiment.

FIG. 6 illustrates a close view of a gripper 600 according to an example embodiment. In some example embodiments, the gripper 600 corresponds to the grippers 108, 110 of FIG. 1, grippers 208, 210 of FIG. 2A, and the gripper 502 of FIG. 5. The gripper 600 includes a first segment 602 and a second segment 604. The first and second segments 602, 604 may be interlocked around a portion of a light guide 608. In some embodiments, a reflector 612 may be positioned between the gripper 600 and the light guide 608 as illustrated in FIG. 4A. A PCB 606 including LEDs 618 is positioned within the gripper 600. The gripper 600 also has an aperture 610 that extends, for example, for the entire length of the gripper 600. One or more fasteners 616, such as a screw, may be inserted in at least a portion of the aperture 610 to securely attach the first segment 602 and the second segment 604 to each other. In an example embodiment, the first segment 602 may serve as a heat sink to dissipate heat from the PCB 606 and the LEDs 618. One or more wires 614 may extend between the PCB 606 and a driver that may be positioned in a center spine (e.g., the center spine 106 of FIG. 1 and the center spine 206 of FIG. 2A) or a driver that, for example, is in a ceiling. In an example embodiment, the light guide 608 corresponds to the light guide 504, of FIG. 5, respectively.

FIG. 7A illustrates a center spine 700 according to an example embodiment. In an example embodiment, the center spine 700 may correspond to the center spine 206 of FIG. 2A. The center spine 700 has an upper segment 701 that has a cavity 702. The cavity 702 may be used to hold one or more drivers, such as LED drivers, that provide power to light sources, such as LEDs, that are positioned in grippers (e.g., the grippers 208, 210 of FIG. 2A) of an edge-lit light guide panel (e.g., the edge-lit light guide panels 202, 204 of FIG. 2A) of an edge-lit light fixture, such as the edge-lit light fixture 200 of FIG. 2A. One or more electrical wires may also be routed through the center spine 700 to lights sources of an edge-lit light fixture. The center spine 700 also includes a protrusion 704 that has a first ledge 706 and a second ledge 708.

In some example embodiments, the ledges 706, 708 may provide support to respective light guides in a manner illustrated, for example, in FIG. 2A. Alternatively or in addition, the ledges 706, 708 may serve to hide the separation between light guides of an edge-lit light fixture from view from below the edge-lit light fixture. For example, a portion of a light guide of a first edge-lit light guide panel may rest on the first ledge 706, and a portion of a light guide of a second edge-lit light guide panel may rest on the second ledge 708. Although the protrusion 704 is shown as having an arrow shape, in alternative embodiments, the protrusion 704 may have other decorative shapes. In some example embodiments, the protrusion 704 may glow and/or emit light. The center spine 700 may be made from a metal or plastic. For example, the center spine 700 may be made from aluminum using a method such as extrusion.

FIGS. 7B and 7C illustrate different views of a center spine 710 according to another example embodiment. In an example embodiment, the center spine 710 may correspond to the center spine 236 of FIG. 2B. The center spine 710 has an upper segment 720 that has a cavity 702. The cavity 702 may be used to hold one or more drivers, such as LED drivers, in a similar manner described with respect to the center spine 700 of FIG. 7A. The center spine 710 also includes a protrusion 714 that has a first ledge 716 and a second ledge 718. In some example embodiments, the ledges 716, 718 may provide support to respective light guides in a manner illustrated, for example, in FIG. 2B. Alternatively or in addition, the ledges 716, 718 may serve to hide the separation between light guides of an edge-lit light fixture from view from below the edge-lit light fixture. For example, a portion of a light guide of a first edge-lit light guide panel may rest on the first ledge 716, and a portion of a light guide of a second edge-lit light guide panel may rest on the second ledge 718.

In some example embodiments, the upper segment 720 and the protrusion 714 may be separate components that are attached, for example, using one or more fasteners (not shown). For example, one or more fasteners may be inserted in one or more holes 722 of the upper segment 720 to securely attach the upper segment 720 and the protrusion 714 to each other.

In some example embodiments, the upper segment 720 and the protrusion 714 may be made from metal and/or plastic. For example, the upper segment 720 and the protrusion 714 may be made from aluminum using a method such as extrusion. Although the protrusion 714 is shown as having an arrow shape, in alternative embodiments, the protrusion 714 may have other decorative shapes. In some example embodiments, the protrusion 714 may glow and/or emit light.

FIG. 8 illustrates a center spine 800 according to another example embodiment. In an example embodiment, the center spine 800 may be used with the edge-lit light fixture 100 of FIG. 1 and the edge-lit light fixture 230 of FIG. 2B. The center spine 800 includes a protrusion 804 that has a first ledge 806 and a second ledge 808. Each of the ledges 806, 808 may function in a similar manner as the ledges 706, 708 of FIG. 7A or the ledges 716, 718 of FIGS. 7B and 7C. In some example embodiments, the center spine 800 may be used when a power such source, such as an LED driver, is located away from edge-lit light fixture that includes the center spine 800. Alternatively, a driver may be positioned on the fingers 802 of the center spine 800 as illustrated in FIG. 10 or between the fingers 802 that are on opposite sides of the center spine 800.

FIG. 9 illustrates an edge-lit light fixture 900 including a center spine according to an example embodiment. For example, the edge-lit light fixture 900 may be a recessed edge-lit light fixture. In an example embodiment, the center spine 904 may correspond to the center spine 700 of FIG. 7A. As illustrated in FIG. 9, a driver 902, such as an LED driver, may be positioned within the center spine 904.

FIG. 10 illustrates an edge-lit light fixture 1000 including a center spine according to an example embodiment. For example, the edge-lit light fixture 1000 may be a recessed edge-lit light fixture. In an example embodiment, the center spine 1004 may correspond to the center spine 800 of FIG. 8. As illustrate in FIG. 10, a driver 1002, such as an LED driver, may be positioned on the center spine 1004 instead of within the center spine 1004.

FIG. 11A illustrates an end cap 1100 of an edge-lit light fixture according to an example embodiment. In an example embodiment, the end cap 1100 corresponds to the end caps 114, 116 of FIG. 1, the end cap 216 of FIG. 2A, and the end cap 246 of FIG. 2B. In some example embodiments, the end cap 1100 includes a first segment 1102 and a second segment 1104. The first segment 1102 and the second segment 1104 may be attached to each other by one or more fasteners (not shown) that extend through one or more apertures 1106 of the first segment 1102 and corresponding one or more apertures 1108 of the second segment 1104. In some example embodiments, one or more cables may be attached to the fasteners to suspend an edge-lit light fixture from a structure such as a ceiling. The second segment 1104 may include a protrusion 1110 that has the same or similar cross-sectional shape as a protrusion (e.g., the protrusion 212 of FIG. 2A) of a center spine, such as the center spine 206 of FIG. 2A.

FIG. 11B illustrates an end cap 1120 of an edge-lit light fixture according to another example embodiment. In an example embodiment, the end cap 1120 corresponds to the end caps 114, 116 of FIG. 1, the end cap 216 of FIG. 2A, and the end cap 246 of FIG. 2B. In some example embodiments, the end cap 1120 includes a first segment 1122 and a second segment 1124. The first segment 1122 and the second segment 1124 may be attached to each other by one or more fasteners (not shown) that extend through one or more apertures 1126 of the first segment 1122 and corresponding one or more apertures 1128 of the second segment 1124. In some example embodiments, one or more cables may be attached to the fasteners to suspend an edge-lit light fixture from a structure such as a ceiling. The second segment 1124 may include a protrusion 1130 that has as the same or similar cross-sectional shape as a protrusion (e.g., the protrusion 212 of FIG. 2B) of a center spine, such as the center spine 236 of FIG. 2B.

FIG. 12 illustrates a joiner end cap 1200 of an edge-lit light fixture according to an example embodiment. In some example embodiments, the joiner end cap 1200 may be used between adjacent light guides of an edge-lit light fixture that includes multiple light guides. For example, multiple light guides may be longitudinally joined as illustrated in FIG. 16. As illustrated in FIG. 12, the joiner end cap 1200 may include a wall 1202 and a ledge 1204. For example, a light guides, such as the light guide 504 of FIG. 5 may be positioned on the ledge 1204 on one side of the joiner end cap 1200. Another pair of light guides may abut against the joiner end cap 1200 on the opposite side of the joiner end cap 1200. In some example embodiments, one or more cables may be attached to the fasteners that may be inserted into one or more holes 1205 to suspend an edge-lit light fixture from a structure such as a ceiling. One or more openings 1208 may be used to purposes such as routing wires. In some example embodiments, the joiner end cap 1200 may include a protrusion 1206 that has as the same or similar cross-sectional shape as a protrusion (e.g., the protrusion 212 of FIG. 2A) of a center spine, such as the center spine 206 of FIG. 2A.

FIG. 13 illustrates an edge-lit light fixture 1300 according to another example embodiment. The edge-lit light fixture 1300 includes grippers 1302, 1304, an end cap 1306, center spines 1308, 1310, and a joiner end cap 1312. The edge-lit light fixture 1300 also includes light guides 1314 on one side of the joiner end cap 1312 and light guides 1318 on another side of the joiner end cap 1312. In some example embodiments, the grippers 1302, 1304 correspond to the gripper 502 of FIG. 5. Similarly, the end cap 1306 corresponds to the end caps 114, 116 of FIG. 1, the end cap 216 of FIG. 2A, the end cap 246 of FIG. 2B, the end cap 100 of FIG. 11A, and the end cap 1120 of FIG. 11B. The center spines 1308, 1310 may correspond to the center spine 700 of FIG. 7A, the center spine 710 of FIG. 7B, and the center spine 800 of FIG. 8. The joiner end cap 1312 may correspond to the joiner end cap 1200 of FIG. 12. As illustrated in FIG. 13, the edge-lit light fixture 1300 may be suspended using cables 1320 that are attached to the end cap 1306 and to the joiner end cap 1312.

Although particular embodiments have been described herein in detail, the descriptions are by way of example. The features of the example embodiments described herein are representative and, in alternative embodiments, certain features, elements, and/or steps may be added or omitted. Additionally, modifications to aspects of the example embodiments described herein may be made by those skilled in the art without departing from the spirit and scope of the following claims, the scope of which are to be accorded the broadest interpretation so as to encompass modifications and equivalent structures.

What is claimed is:

1. An edge-lit light fixture, comprising:
a first edge-lit light guide panel having a first light guide;
a second edge-lit light guide panel having a second light guide; and
a center spine having a protrusion, wherein the first edge-lit light guide panel and the second edge-lit light guide panel are positioned on opposite sides of the protrusion, wherein the protrusion separates a narrow edge of the first light guide from a narrow edge of the second light guide, and wherein a portion of the protrusion is positioned below the first light guide and the second light guide;
wherein the center spine includes an upper segment having a cavity, wherein the upper segment is attached to the protrusion, and wherein the upper segment is positioned above the first light guide and the second light guide; and
wherein the cavity is sized to accommodate a driver therein, the driver to provide power to a light source of the edge-lite light fixture.

2. The edge-lit light fixture of claim 1, wherein the protrusion includes a first ledge and a second ledge, wherein a portion of the first light guide proximal to the narrow edge of the first light guide is positioned on the first ledge, and wherein a portion of the second light guide proximal to the narrow edge of the second light guide is positioned on the second ledge.

3. The edge-lit light fixture of claim 1, further comprising a first light source and a second light source, wherein the first light source is positioned proximal to a second narrow edge of the first light guide distal from the center spine and wherein the second light source is positioned proximal to a second narrow edge of the second light guide distal from the center spine.

4. The edge-lit light fixture of claim 3, wherein the first edge-lit light guide panel comprises a first gripper, wherein the second edge-lit light guide panel comprises a second gripper, wherein the second narrow edge of the first light guide and the first light source are positioned within the first gripper, and wherein the second narrow edge of the second light guide and the second light source are positioned within the second gripper.

5. The edge-lit light fixture of claim 4, further comprising a first end cap and a second end cap, wherein the first end cap is attached to the first gripper and to the second gripper on a first side of the edge-lit light fixture and wherein the second end cap is attached to the first gripper and to the second gripper on a second side of the edge-lit light fixture.

6. The edge-lit light fixture of claim 4, further comprising a reflector that is positioned between a surface of the first gripper and a portion of the first light guide that is positioned within the first gripper.

7. The edge-lit light fixture of claim 4, wherein the edge-lit light fixture is suspended using one or more cables attached to the first end cap and a second end cap.

8. The edge-lit light fixture of claim 1, wherein the protrusion and the upper segment are formed separately.

9. The edge-lit light fixture of claim 1, further comprising:
a third edge-lit light guide panel having a third light guide;
a fourth edge-lit light guide panel having a fourth light guide;
a second center spine having a second protrusion, wherein the third edge-lit light guide panel and the fourth edge-lit light guide panel are positioned on opposite sides of the second protrusion; and
a joiner end cap, wherein the joiner end cap is positioned between the first edge-lit light guide panel and the third edge-lit light guide panel, between the second edge-lit light guide panel and the fourth edge-lit light guide panel, and between the protrusion and the second protrusion.

10. The edge-lit light fixture of claim 9, wherein the joiner end cap includes a third protrusion that is positioned between the protrusion and the second protrusion.

11. An edge-lit light fixture, comprising:
a first edge-lit light guide panel having a first light guide;
a second edge-lit light guide panel having a second light guide;
a center spine having a protrusion and an upper segment, wherein the first edge-lit light guide panel and the second edge-lit light guide panel are positioned on opposite sides of the protrusion, and wherein the first upper segment and the protrusion are separate structures that are attached to each other with one or more fasteners;
a first light source and a second light source, wherein the first light source is positioned proximal to a second narrow edge of the first light guide distal from the center spine and wherein the second light source is positioned proximal to a second narrow edge of the second light guide distal from the center spine; and
wherein the protrusion includes a first ledge and a second ledge, wherein a portion of the first light guide is positioned on the first ledge, and a portion of the second light guide is positioned on the second ledge.

12. The edge-lit light fixture of claim 11, wherein the protrusion extends along the length of a length of the center spine.

13. The edge-lit light fixture of claim 11, wherein the upper segment includes one or more holes for attaching the upper segment and the protrusion to each other using the one or more fasteners.

14. The edge-lit light fixture of claim 11, wherein the first edge-lit light guide panel comprises a first gripper, wherein the second edge-lit light guide panel comprises a second gripper, wherein the second narrow edge of the first light guide and the first light source are positioned within the first gripper, and wherein the second narrow edge of the second light guide and the second light source are positioned within the second gripper.

15. The edge-lit light fixture of claim 11, wherein the upper segment is positioned above the first light guide and the second light guide, the upper segment having a cavity.

* * * * *